United States Patent
Tsuda et al.

(10) Patent No.: US 6,326,437 B1
(45) Date of Patent: Dec. 4, 2001

(54) AQUEOUS-DISPERSING COMPOSITION OF CROSSLINKABLE FLUORINE-CONTAINING RESIN

(75) Inventors: Nobuhiko Tsuda; Katsuhiko Imoto; Nobuo Mitsuhata; Masaru Nagato, all of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/530,012

(22) PCT Filed: Oct. 13, 1998

(86) PCT No.: PCT/JP98/04603
§ 371 Date: Apr. 24, 2000
§ 102(e) Date: Apr. 24, 2000

(87) PCT Pub. No.: WO99/21920
PCT Pub. Date: May 6, 1999

(30) Foreign Application Priority Data

Oct. 24, 1997 (JP) .................................................. 9-292510

(51) Int. Cl.[7] .......................... C08F 259/08; C08F 14/18; C08F 18/14
(52) U.S. Cl. .......................... 525/276; 526/250; 526/255; 526/328.5; 526/332; 524/545; 524/560
(58) Field of Search .............................. 525/276; 526/250, 526/255, 328.5, 332; 524/545, 560

(56) References Cited

U.S. PATENT DOCUMENTS

| | | | |
|---|---|---|---|
| 4,791,166 | * 12/1988 | Saukaitis | 526/245 |
| 5,646,201 | * 7/1997 | Araki et al. | 523/201 |

FOREIGN PATENT DOCUMENTS

| | | | |
|---|---|---|---|
| 10-120801 | 5/1998 | (JP) | C08J/5/18 |
| 5-32841 | 2/1993 | (JP) | C08L/27/12 |
| 8-120211 | 5/1996 | (JP) | C09D/127/12 |

OTHER PUBLICATIONS

International Search Report.

* cited by examiner

Primary Examiner—James J. Seidleck
Assistant Examiner—Olga Asinovsky
(74) Attorney, Agent, or Firm—Sughrue, Mion, Zinn, Macpeak & Seas, PLLC

(57) ABSTRACT

An aqueous-dispersing composition of a crosslinkable fluorine-containing resin which comprises an aqueous dispersion of a fluorine-containing seed polymer (B) obtained by seed-polymerizing a non-fluorine-containing monomer containing a non-fluorine-containing monomer (a) having carboxyl group and/or acetoacetyl group and a reactive $\alpha,\beta$-unsaturated group, in an aqueous medium in the presence of particles of a fluorine-containing polymer (A) and a polyvalent metal compound capable of metal crosslinking.

2 Claims, No Drawings

AQUEOUS-DISPERSING COMPOSITION OF CROSSLINKABLE FLUORINE-CONTAINING RESIN

FIELD OF THE INVENTION

The present invention relates to an aqueous-dispersing composition of a crosslinkable fluorine-containing resin for an aqueous coating or paint for use in the interior and exterior of a building.

DESCRIPTION OF THE RELATED ART

In the field of paints, various aqueous dispersions have been hitherto proposed. JP-A-5-32841, JP-B-47-15597 and JP-B-49-1458 disclose compositions comprising, as essential components, a synthetic resin crosslinkable with metal and a polyvalent metal compound. However, when these compositions are used in applications for the interior and exterior of a building, since a coating film thereof is easily deteriorated by an aqueous alkali medium, there is a disadvantage in that it is difficult to apply such compositions particularly to alkali substrates of concrete, ALC and slate.

In view of the above, an object of the present invention is to provide an aqueous dispersing composition of a fluorine-containing resin crosslinkable at room temperature, which is useful as a binder for coating and excellent in film forming property, stain-proofing property, weather resistance, chemical resistance and storage stability, by combining a specific fluorine-containing polymer with a polyvalent metal compound which can form a metal crosslinking structure.

SUMMARY OF THE INVENTION

The present invention relates to an aqueous-dispersing composition of crosslinkable fluorine-containing resin, which comprises a metal-crosslinking-formable polyvalent metal compound and an aqueous dispersion of fluorine-containing seed polymer (B) obtained by seed-polymerizing a non-fluorine-containing monomer containing a non-fluorine-containing monomer (a) having a carboxyl group and/or acetoacetyl group and a reactive α,β-unsaturated group, in an aqueous medium in the presence of particles of a fluorine-containing polymer (A).

DETAILED DESCRIPTION OF THE INVENTION

The aqueous-dispersing composition of resin of the present invention comprises a metal-crosslinking-formable polyvalent metal compound and an aqueous dispersion of a fluorine-containing seed polymer (B) obtained by seed-polymerizing a non-fluorine-containing monomer containing a non-fluorine-containing monomer (a) having a specific functional group in an aqueous medium in the presence of particles of a fluorine-containing polymer (A). Each component is explained below.

1. Aqueous dispersion of Particles of Fluorine-containing Copolymer (A)

Examples of the fluorine-containing polymer (A) are polymers obtained by polymerizing a fluoroolefin as an essential component.

Examples of the fluoroolefin are, for instance, fluoroolefins having about 2 to 4 carbon atoms such as vinyl fluoride, vinylidene fluoride (VdF), tetrafluoroethylene (TFE), chlorotrifluoroethylene (CTFE), hexafluoropropylene (HEP) and trifluoroethylene.

Examples of the fluoroolefin polymer are homopolymers of those fluoroolefins or known copolymers comprising two or more of those fluoroolefins. Examples thereof are homopolymers of VdF, TFE and CTFE, VdF/TFE copolymer, VdF/HFP copolymer, VdF/CTFE copolymer, VdF/TFE/CTFE copolymer, VdF/TFE/HFP copolymer, TFE/HFP copolymer, and the like.

An aqueous dispersion of particles of the fluoroolefin polymers can be prepared through usual emulsion polymerization, namely, by emulsion-polymerizing a fluoroolefin monomer or monomer mixture in the presence of an emulsifying agent in an amount of not more than 5% by weight, preferably not more than 1% by weight on the basis of water.

Water used for the emulsion polymerization is preferably de-ionized water. Also it is preferable that the emulsifying agent is a fluorine-containing surfactant. Further, a reactive fluorine-containing emulsifying agent can be used. It is also possible to use a slight amount of a non-fluorine-containing nonionic emulsifying agent in combination.

The fluorine-containing emulsifying agent is one or a mixture of compounds having a structure containing fluorine atoms and having surface activity. Examples thereof are an acid represented by $X(CF_2)_n COOH$, in which n is an integer of 6 to 20, X is F or H, its metal salt, ammonium salt, amine salt or quaternary ammonium salt; an acid represented by $Y(CH_2CF_2)_m COOH$, in which m is an integer of 6 to 13, Y is F or Cl, its metal salt, ammonium salt, amine salt or quaternary ammonium salt; and the like. In addition, it is possible to use solely a reactive emulsifying agent disclosed in JP-A-8-67795 and to use the reactive emulsifying agent in combination with the above-mentioned fluorine-containing emulsifying agent. Also it is possible to use a non-fluorine-containing nonionic emulsifying agent disclosed in JP-A-7-90153 together.

Examples of the other fluoroolefin polymer are, for instance, copolymers with a non-fluorine-containing monomer (excluding the above-mentioned non-fluorine-containing monomer (a) having functional group) being copolymerizable with fluoroolefin.

Examples of the non-fluorine-containing monomer copolymerizable with fluoroolefin are, for instance, α-olefins such as ethylene, propylene and isobutylene; vinyl ethers such as ethyl vinyl ether (EVE), cyclohexyl vinyl ether (CHVE), hydroxybutyl vinyl ether (HBVE), butyl vinyl ether, isobutyl vinyl ether, methyl vinyl ether and polyoxyethylene vinyl ether; alkenyls such as polyoxyethylene allyl ether, ethyl allyl ether, hydroxyethyl allyl ether, allyl alcohol and ally ether; vinyl esters such as vinyl acetate, vinyl lactate, vinyl butyrate, vinyl pivalate, vinyl benzoate, and VEOVA9 and VEOVA10 (names of products available from Shell Chemical Co., Ltd.); and the like. Particularly α-olefins, vinyl ethers, vinyl esters and alkenyls are preferably used.

Examples of the copolymers are TFE/propylene copolymer, TFE/ethylene copolymer, TFE/vinyl ester copolymers, TFE/vinyl ether copolymers, HFP/vinyl ether copolymers, HFP/vinyl ester copolymers, CTFE/vinyl ether copolymers, and the like. Further, there are copolymers comprising three or more monomers, i.e. copolymers containing the above-mentioned copolymer and as a modifying monomer, the above-mentioned monomer copolymerizable with fluoroolefin in an amount of not more than 30% by mole.

The aqueous dispersions of particles of the fluoroolefin copolymers can be prepared through usual emulsion polymerization. The emulsion polymerization method may be the same as in the polymerization method of the fluoroolefin polymer of above (1) except that the mixture of the fluoroolefin and monomer copolymerizable with fluoroolefin is used.

It is preferable that the fluoroolefin monomer is contained in the copolymers comprising the fluoroolefin and non-fluorine-containing monomer in an amount of 20 to 80% by mole. When an amount of the fluoroolefin monomer is less than 20% by mole, sufficient weather resistance cannot be exhibited. When the amount is more than 80% by mole, there is a tendency that at the time of making a coating and forming a coating film, a lowering of appearance occurs.

The aqueous dispersion of fluorine-containing seed polymer (B) of the present invention can be prepared by seed-polymerizing a non-fluorine-containing monomer (a) having carboxyl group and/or acetoacetyl group and a reactive α,β-unsaturated group in an aqueous medium in the presence of particles of the above-mentioned fluorine-containing polymer (A).

The non-fluorine-containing α,β-unsaturated monomer (a) having a carboxyl group and/or acetoacetyl group functions to impart stain-proofing property and stain removable property to a coating film by coordinate-bonding to a metal compound and forming a crosslinked structure.

Examples of the non-fluorine-containing α,β-unsaturated monomer having carboxyl group are, for instance, α,β-unsaturated carboxylic acids such as acrylic acid, methacrylic acid, itaconic acid, succinic acid, succinic anhydride, fumaric acid, fumaric anhydride, crotonic acid, maleic acid and maleic anhydride. Among them, acrylic acid and methacrylic acid are preferred from the viewpoint of copolymerizability.

A preferred non-fluorine-containing α,β-unsaturated monomer having acetoacetyl group is, for example, acetoacetoxyethyl methacrylate (AAEM).

As the monomer (a), one or a mixture of two or more monomers is used.

It is preferable that the non-fluorine-containing monomer for the seed polymerization contains a non-fluorine-containing monomer other than the monomer (a).

Examples of such a non-fluorine-containing monomer are reactive α,β-unsaturated monomers such as alkyl acrylate having an alkyl of Cl to C18 and alkyl methacrylate having an alkyl of Cl to C18 and monomers having an ethylenically unsaturated unit copolymerizable therewith.

As the alkyl acrylates having an alkyl of Cl to C18, there are, for example, methyl acrylate, ethyl acrylate, propyl acrylate, n-butyl acrylate, isobutyl acrylate, 2-ethylhexyl acrylate, lauryl acrylate and the like.

As the alkyl methacrylates having an alkyl of Cl to C18, there are, for example, methyl methacrylate, ethyl methacrylate, propyl methacrylate, n-propyl methacrylate, isobutyl methacrylate, cyclohexyl methacrylate, lauryl methacrylate and the like.

For the purposes of enhancing solvent resistance and water resistance, it is possible to copolymerize a polyfunctional monomer such as ethylene glycol dimethacrylate or propylene glycol dimethacrylate.

Examples of the monomer which has an ethylenically unsaturated unit copolymerizable with the acrylate and/or the methacrylate are, for instance, a-olefins such as ethylene, propylene and isobutylene; vinyl ethers such as ethyl vinyl ether (EVE), cyclohexyl vinyl ether (CHVE), hydroxybutyl vinyl ether (HBVE), butyl vinyl ether, isobutyl vinyl ether, methyl vinyl ether and polyoxyethylene vinyl ether; alkenyls such as polyoxyethylene allyl ether, ethyl allyl ether, hydroxyethyl allyl ether, allyl alcohol and allyl ether; vinyl esters such as vinyl acetate, vinyl lactate, vinyl butylate, vinyl pivalate, vinyl benzoate, and VEOVA9 and VEOVA10 (names of products available from Shell Chemical Co., Ltd.); aromatic vinyl compounds such as styrene, cx-methyl styrene and p-tert-butyl styrene; acrylonitrile; and the like.

It is preferable that the monomer (a) is contained in the obtained fluorine-containing seed polymer (B) in an amount of from 0.1 to 10% by weight, particularly from 0.5 to 5% by weight. When the content of the monomer (a) is decreased, an effect of improvement in stain-proofing property and stain removable property tends to be lowered, and when the content is increased, coating stability is lowered and the appearance of the coating film is lowered.

In the present invention, it is preferable that the seed polymer (B) contains the fluoroolefin monomer in an amount of 20 to 90% by mole on the basis of the whole seed polymer. When the amount of fluoroolefin monomer is less than 20% by mole, weather resistance is not exhibited sufficiently, and when the amount is more than 90% by mole, at the time of making a coating and forming a coating film, appearance of the film is lowered.

The seed polymerization of the non-fluorine-containing monomer containing the monomer (a) can be carried out under the same conditions as in usual emulsion polymerization. For example, to a water medium containing particles of the fluorine-containing polymer (A), a surfactant, a polymerization initiator and a chain transfer agent are added, and as the case demands, a chelating agent, a pH control agent, a solvent, etc., are also added. Then the reaction is conducted at about 20° C. to about 90° C. for about 0.5 hour to about 6 hours.

When the emulsion polymerization of the non-fluorine-containing monomer is carried out in the presence of particles of the fluorine-containing polymer, it seems that at first, there occurs swelling of the particles of the fluorine-containing polymer with the monomer. At that time, the mixture achieves a state of an aqueous dispersion of the particles of fluorine-containing polymer dissolved uniformly in the monomer. Then, the non-fluorine-containing monomer is polymerized by adding an initiator, thus forming single phase polymer blend particles, in which the molecular chains of the polymers are entangled with each other.

As a surfactant, an anionic surfactant, nonionic surfactant or a combination of the anionic and nonionic surfactants is used, and as the case demands, an amphoteric surfactant can be used.

Examples of the anionic surfactant are a sulfate of higher alcohol, sodium alkylsulfonate, sodium alkylbenzenesulfonate, sodium dialkylsulfosuccinate, sodium alkyldiphenylether disulfonate, and the like. Examples of the nonionic surfactant are polyoxyethylene alkyl ethers, polyoxyethylene alkyl phenyl ethers, polyoxyethylene alkyl esters, polyoxyethylene alkyl phenyl esters, sorbitan alkyl esters, glycerol esters, their derivatives, and the like.

The amphoteric surfactant includes lauryl betaine, and the like. Further, a so-called reactive emulsifying agent which is copolymerizable with the ethylenically unsaturated monomer can be used.

Examples of the commercially available reactive emulsifying agent are Blemmar PE-350, Blemmar PME-400 and Blemmar 7OPEP35OB (available from NOF Corporation); NK Ester M40G, NK Ester M-90G and NK Ester M-230G (available from Shin-Nakamura Kagaku Kabushiki Kaisha); RMA4SOM (available from Nippon Nyukazai Kabushiki Kaisha); Aquaron HS10, Aquaron HS20, Aquaron HS1025, Aquaron RN 10, Aquaron RN20, Aquaron RN30, Aquaron RN50 and Aquaron RN2025 (available from Dai-ichi Kogyo Seiyaku Kabushiki Kaisha); NK Ester AMP-60G, NK Ester CB-1, NK Ester SA and NK Ester A-SA; Eleminol JS2 and Eleminol RS30 (available from Sanyo Kasei Kogyo Kabushiki Kaisha); Latemle WX (available from Kao Corporation); and the like.

The amount of the surfactant is usually from about 0.05 part by weight to about 5.0 parts by weight on the basis of 100 parts by weight of the ethylenically unsaturated monomer.

The initiator is not particularly limited as long as a radical which can be used for free radical polymerization in an aqueous medium is produced at 20° to 90° C. As the case demands, the initiator can be used in combination with a reducing agent. Examples of the water-soluble initiator are, for instance, a persulfate, hydrogen peroxide, 2,2-azobis(2-amidinopropane) hydrochloride (AIBA) and the like, and examples of the reducing agent are sodium pyrosulfite, sodium hydrogensulfite, sodium L-ascorbate, and the like. Examples of the oil-soluble initiator are diisopropylperoxydicarbonate (IPP), benzoyl peroxide, dibutyl peroxide, azobisisobutyronitrile (AIBN), and the like. An amount of the initiator is usually from about 0.05 part by weight to about 2.0 parts by weight on the basis of 100 parts by weight of the ethylenically unsaturated monomer.

The polymerization temperature may be from 20° to 90° C.

Examples of the chain transfer agent are a halogenated hydrocarbon (for example, chloroform, carbon tetrachloride, or the like), mercaptans (for example, n-lauryl mercaptan, t-lauryl mercaptan or n-octyl mercaptan) and the like. An amount of the chain transfer agent is usually from 0 to about 5.0 parts by weight on the basis of 100 parts by weight of the ethylenically unsaturated monomer.

As the solvent, methyl ethyl ketone, acetone, trichlorotrifluoroethane, methyl isobutyl ketone, cyclohexanone, ethyl acetate, or the like may be used in such a small amount as not to lower workability, safety against disaster, safety in environment and safety in production. By adding the solvent, there is a case where the swelling property of the monomer into the particles of the fluorine-containing polymer for seed polymerization is improved.

The seed polymerization can be carried out by known methods, for example, a method of charging the whole amount of the monomer in one lot in a reaction system in the presence of particles of the fluorine-containing polymer (A), a method of charging a part of the monomer for the reaction and then charging the remaining monomer continuously or dividedly, or a method of charging the whole amount of the monomer continuously.

With respect to the aqueous dispersion of the fluorine-containing polymer (A) used for the seed polymerization, it is preferable that a particle size of the polymer in the aqueous dispersion is not more than 180 nm, more preferably not more than 150 nm, and the content of the polymer is in the range of from 30 to 50% by weight, more preferably from 35 to 60% by weight, in order to decrease the particle size after the seed polymerization to not more than 200 nm. When the particle size after the seed polymerization exceeds 200 nm, there is a case where sedimentation stability of the aqueous dispersion is lowered and an increase in a minimum film forming temperature of the aqueous dispersion occurs even if resins having the same composition are used.

2. Metal-crosslinking-formable Polyvalent Metal Compound

Examples of the metal-crosslinking-formable polyvalent metal compound used in the present invention are a metal complex, metal chelate, metal salt, and the like. Particularly, a compound which is dissociated in water to produce polyvalent metal ions is preferred. Also, the polyvalent metal compound can be used in the form of a basic or acid aqueous dispersion. As a metal constituting the metal compound, polyvalent metals such as beryllium, magnesium, calcium, strontium, barium, cadmium, nickel, copper, zinc, zirconium, aluminum, bismuth, antimony, lead, cobalt and iron can be used. In addition, polyvalent metals such as metals of Group IV of the Periodic Table and alkali earth metals are preferred.

Examples of the metal complex are complexes of the above-mentioned metals and amines such as morphorine, monoethanolamine, diethylaminoethanol and ethylenediamine. Examples of the metal chelates are chelates coordinated in the form of bidentate ligand such as glycinato and alaninato Examples of the metal salt are inorganic salts, e.g., acetates such as zinc acetate, zirconium acetate, magnesium acetate, cadmium acetate and copper acetate; nitrates such as zinc nitrate, calcium nitrate, nickel nitrate and zirconyl nitrate; sulfates such as calcium sulfate and magnesium sulfate; chlorides such as zinc chloride and calcium chloride; carbonates such as zinc carbonate, calcium carbonate, cadmium carbonate and barium carbonate; and the like and organic salts of the above-mentioned metals, e.g., glycine, benzoic acid and salicylic acid.

Among them, from the viewpoint of water resistance of the obtained coating film, compounds of metals such as magnesium, calcium, strontium, zinc and zirconium and in addition, salts and chlorides of those metals with acetic acid, nitric acid, carbonic acid and sulfuric acid are preferred. Particularly preferred are zinc acetate, zirconium nitrate, magnesium sulfate and calcium chloride, and the like.

A method of adding the polyvalent metal compound is optionally selected from a method in which the polyvalent metal compound is dissolved in water and the aqueous solution is added to the aqueous dispersion of fluorine-containing seed polymer, a method in which the polyvalent metal compound is suspended in water and the suspension is added to the aqueous dispersion of fluorine-containing seed polymer, a method in which the polyvalent metal compound in the form of powder is directly added to the aqueous dispersion of fluorine-containing seed polymer, or the like.

The carboxyl group and/or acetoacetyl group introduced into the fluorine-containing seed polymer (B) is coordinated on a metal ion generated from the polyvalent metal compound to form a metal bridge bond. As a result, enhancement of water resistance, anti-blocking property and stain-proofing property is exhibited.

From the viewpoint of the coordination of a functional group, that is, carboxyl group and/or acetoacetyl group in the fluorine-containing seed polymer (B) with a metal ion, it is preferable that an addition amount of the polyvalent metal compound is from about 0.1 equivalent to about 3 equivalent on the basis of the functional group. When less than 0.1 equivalent, the effect on stain-proofing property and stain removable property tends to be small and when in excess of 3 equivalents, water resistance of a coating film and storage stability of the aqueous dispersion tend to be lowered.

The aqueous-dispersing composition of crosslinkable fluorine-containing resin of the present invention can be used in the form of an aqueous paint as a surface protective coating for an inorganic substrate such as concrete, slate and ALC plate and metallic substrate, and further as a coating for coated paper by adding thereto additives such as a pigment, thickener, dispersing agent, anti-foaming agent, anti-freezing agent, film forming aid, ultraviolet ray absorbing agent and antioxidant which are generally used for aqueous emulsion paints. Also, the aqueous-dispersing composition can be used as a coating for patterning by adding thereto natural stone, synthetic beads for flatting, etc.

Also the aqueous-dispersing composition can be used as an aqueous paint for painting the exterior and/or interior of a low- or medium-storied building.

The content of the aqueous-dispersing composition in the paint varies depending on the form of a paint, coating method, etc. The content may be selected so that a solid content of the aqueous-dispersing composition of the present invention is from about 5% by weight to about 95% by weight, usually from 20 to 90% by weight.

For application of such an aqueous paint, a known application method can be employed. In the application, known coating apparatuses such as a brush, roller, roll coater, air sprayer, airless sprayer, electrostatic coating machine, dip coater and electrocoating machine can be used.

The above-mentioned aqueous paint can be applied to various substrates, namely, not only to metals such as iron, aluminum, copper and alloys thereof, but also to inorganic materials such as glass, cement and concrete, resins such as FRP, acrylic resin, vinyl chloride resin, polycarbonate resin and polyurethane resin, wood and fiber. Also if necessary, a substrate may be subjected to pre-coating or surface treating of an under coating such as an aqueous resin emulsion coating or a solvent type coating. The coating composition of the present invention can be applied after optionally carrying out under-coating or pre-coating. The coating system can be applied as a clear coating or enamel coating on various known substrates having uneven surface patterns and color patterns. After the application, the coating film is usually dried for curing at 5° to 300° C. for 30 seconds to one week. The coating thickness is not particularly limited, and is usually from about 1 μm to about 200 μm, preferably from 5 to 100 μm, more preferably from 10 to 50 μm.

Since the thus obtained coated article is excellent in stain-proofing property, stain removing property, adhesion, weather resistance and chemical resistance and a surface of the coating film has a gloss, lubricity and hardness, the article can be used in a wide range of applications. Namely, there are wide applications for coating the interior and exterior of electric appliances (electronic range, toaster, refrigerator, washing machine, hair dryer, television set, videocassette recorder, amplifier, radio, electric pot, rice cooker, radio with cassette recorder, cassette deck, compact disk player, video camera, etc.); the interior and exterior of air conditioner such as an indoor unit, outdoor unit, louver, duct, air cleaner and heater); illumination apparatuses such as a fluorescent lamp, chandelier and a reflection plate; furniture; machine parts; decorations; combs; frames for glasses; natural fiber; synthetic fiber (in the form of a yarn or woven fabric obtained therefrom); the interior and exterior of office machines (phone, facsimile machine, copying machine (including rollers), camera, overhead projector, prototype projector, clock, slide projector, desk, bookshelf, locker, shelf for documents, chair, bookends and electronic whiteboard); car-related parts (wheel, door mirror, lace, door handle, number plate, handle and instrument panel); cooking utensils (range hood, sink, cooking panel, cooking knife, chopping board, water tap, gas range and ventilator); for indoor coating of a partition plate, bath unit, shutter, blind, curtain rail, accordion curtain, wall, ceiling and floor; and for outdoor coating of a housing such as a wall, handrail, door and shutter, and for outdoor coating of a building such as sizing material of ceramic, foamed concrete panel, concrete panel, aluminum curtain wall, steel plate, galvanized steel plate, stainless steel plate, vinyl chloride sheet and window glass; and the like.

EXAMPLES

1. Preparation Example 1

A 1-liter pressure resistive reaction vessel provided with a stirrer was charged with 500 ml of deionized water, 0.5 g of ammonium perfluorooctanoate and 0.05 g of polyoxyvethylene monostearate (POE40). After repeating introduction of nitrogen under pressure and deaeration and then removing dissolved oxygen, a pressure was applied at 60° C. up to 10 kgf/cm$^2$ with a monomer mixture of VdF/TFE/CTFE having a mole percent ratio of 74/14/12. Then, 20 g of a 1% aqueous solution of ammonium persulfate and 1.5 g of ethyl acetate were added and the monomer mixture of VdF/TFE/CTFE having a mole percent ratio of 74/14/12 was supplied continuously so that the inside pressure of the vessel was maintained constant at 10 kgf/cm$^2$. The reaction was continued and 5 g of a 1% aqueous solution of ammonium persulfate was added every 12 hours. Thus the reaction was carried out for 41 hours. Then the temperature and pressure inside the vessel were returned to normal to give an aqueous dispersion of the particles of fluorine-containing polymer (A) (solid content: 42% by weight). With respect to the obtained aqueous dispersion, measurements were carried out as follows.

Average particle size: Measurement was carried out with a laser beam scattering particle size meter (DLS-3000 available from Otsuka Denshi)

The results are such that the average particle size was 134 nm.

2. Preparation Example

A 500-milliliter four neck flask provided with a stirrer, cooling tube and thermometer was charged with 120 g of the aqueous dispersion of the fluorine-containing polymer obtained in Preparation Example 1, and thereto was added 1.0 g of aqueous solution of alkali salt of alkyl allyl sulfosuccinate (brand name ELEMINOL JS2 available from Sanyo Kasei Kogyo Kabushiki Kaisha, solid content: 38%) on the basis of the solid content. The mixture was heated with stirring in a water bath, and at the time when the bath temperature reached 80° C., to the mixture was added dropwise over one hour an emulsion prepared by emulsifying a monomer mixture comprising 24 g of methyl methacrylate (MMA), 3.0 g of butyl acrylate (BA), 0.05 g of acrylic acid (AAc) and 0.02 g of n-laurylmercaptan (n-LM) with a 0.5% aqueous solution of alkali salt of alkyl allyl sulfosuccinate. Further, 3.0 g of a 50% aqueous solution of polyoxyethylene methacrylate (brand name RMA450M available from Nippon Nyukazai Kabushiki Kaisha) was added and immediately after that, 1 ml of a 2% aqueous solution of ammonium persulfate was added to initiate a reaction. Three hours after initiation of the reaction, the temperature inside the bath was elevated to 85° C. and maintained for one hour. Then, after water was removed under reduced pressure for concentration, the mixture was cooled. After adjusting pH to 7 and a solid content to 50% with ammonia water, filtration was carried out with a metal net of 300 mesh to give a bluish white aqueous dispersion of particles of fluorine-containing seed polymer (B). With respect to the aqueous dispersion, a content and an average particle size of a monomer (a) having functional group were measured. The results are shown in Table 1.

Content of a monomer (a) having functional group: % by weight of an added monomer having a functional group on the basis of the solid content of the fluorine-containing seed polymer.

3. Preparation Examples 3 to 9

Aqueous dispersions of particles of fluorine-containing seed polymer (B) were obtained in the same manner as in Preparation Example 2 except that each component shown in Table 1 was used, and the characteristics thereof were determined. The results are shown in Table 1.

Abbreviations in Table 1 are as follows.
MMA: Methyl methacrylate
BA: Butyl acrylate
AAc: Acrylic acid
AAEM: Acetoacetoxyethyl methacrylate
n-LM: n-Laurylmercaptan

TABLE 1

|  | Preparation Example | | | | | | | |
| --- | --- | --- | --- | --- | --- | --- | --- | --- |
|  | 2 | 3 | 4 | 5 | 6 | 7 | 8 | 9 |
| Addition amount of aqueous dispersion of fluorine-containing polymer particles obtained in Preparation Example 1 (solid content, part by weight) | 120 (50.4) | 120 (50.4) | 120 (50.4) | 120 (50.4 | 120 (50.4) | 93 (39.1) | 48 (20.2) | 48 (20.2) |
| Radically polymerizable monomer (part by weight) | | | | | | | | |
| MMA | 24 | 23.8 | 23.5 | 23 | 23 | 25 | 40 | 38 |
| BA | 3 | 3 | 3 | 3 | 3 | 9.2 | 10 | 10 |
| Aac | 0 | 0.25 | 0.5 | 1 | — | 3.8 | 7 | 9 |
| AAEM | — | — | — | — | 1 | — | — | — |
| n-LM | 0.02 | 0.02 | 0.02 | 0.02 | 0.02 | 0.04 | 0.05 | 0.05 |
| Fluorine-containing seed polymer (B) | | | | | | | | |
| Content of monomer (a) having functional Group (% by weight) | 0 | 0.31 | 0.65 | 1.3 | 1.3 | 4.9 | 9.1 | 11.6 |
| Average particle size (nm) | 149 | 153 | 156 | 159 | 161 | 173 | 190 | 192 |

4. Examples 1 to 11 and Comparative Examples 1 to 4: Preparation of white coating.

A polyvalent metal compound was added and mixed in an amount shown in Table 2 to 100 parts each of the aqueous dispersions obtained in Preparation Examples 2 to 9. Then to the mixture were added 47 parts of a pigment paste (prepared by mixing and dispersing 70 parts of titanium oxide (brand name CR97 available from Ishihara Sangyo Kabushiki Kaisha) as a filler, 1 part of ethylene glycol as an anti-freeze agent, 1 part of SOLSPARSE 2000 (available from Zeneca Co., Ltd.) as a dispersing agent, 0.5 part of FS ANTI-FOAM 013B (available from Dow Corning Co., Ltd.) as an anti-foaming agent and 27.5 parts of water), 0.2 part of UH420 (available from Asahi Denka Kabushiki Kaisha) as a viscosity control agent and 5 parts of diethyl adipate as a film forming aid, followed by mixing sufficiently with a dispersing stirrer to give a coating.

The following items were measured by using the obtained white coating. The results are shown in Table 2. (Initial characteristics of white coating film)

Gloss: The obtained white coating was applied on a glass plate using a 10 mil applicator, and dried for 20 minutes with a blow dryer at 80° C. A glossiness at 60° reflection was measured using a gloss meter (available from Suga Shikenki Kabushiki Kaisha).

Pencil hardness: Measured according to the pencil hardness test of JIS K5400.

Alkali resistance: The obtained white coating was applied on a slate by air spraying to obtain a coating amount of 120 g/m$^2$, and then dried for 20 minutes with a blow dryer at 80° C. to give a test piece. With respect to the coating film, a spot test was carried out with a 5% aqueous solution of sodium hydroxide at 30° C. for one week, and chromaticity coordinates were measured with a colorimeter (CR300 available from Minolta Co., Ltd.). A difference Δb in brightness between before and after the exposure was assumed to be an index for alkali resistance. The smaller the difference, the more excellent the alkali resistance.

Hot water resistance: To 200 g each of the aqueous dispersions obtained in the Examples and Comparative Examples were added 0.5 part of UH420 (available from Asahi Denka Kabushiki Kaisha) as a viscosity control agent and 10 parts of diethyl adipate as a film forming aid, followed by mixing sufficiently with a dispersing stirrer to give a clear coating. The obtained clear coating was applied to a glass plate with a 10 mil applicator and dried for 20 minutes with a blow dryer at 800° C. to give a transparent coating film. The obtained coating film was dipped in hot water for 20 minutes and removed. Transmittance of visible light at 600 nm through the coating film was measured and evaluated as follows.

○: Transmittance of visible light is not less than 85%
Δ: Transmittance of visible light is not less than 70% and less than 85%.
x : Transmittance of visible light is less than 70%.

(Stain-proofing property of white coating)

The obtained coating was applied to an aluminum plate subjected to chemical conversion treatment using a 10 mil applicator and dried at room temperature for one week to give a test piece.

Stain-proofing property: Chromaticity coordinates were measured with a colorimeter (CR300 available from Minolta Co., Ltd.) before and after 3-month outdoor exposure of the test piece set on an exposure rack placed at an angle of 30° and facing toward the southern direction in Settsu-shi, Osaka Prefecture. A difference Δb in brightness between before and after exposure was assumed to be an index for stain-proofness. The smaller the difference, the less the adhesion of stains.

Stain removable property: An aqueous dispersion of carbon was sprayed onto the surface of the test piece and dried for 2 hours using a blow dryer at 60° C., followed by washing with flowing water using a brush. Chromaticity coordinates were measured with a colorimeter (CR300 available from Minolta Co., Ltd.) before and after the test. A difference Δb in brightness between before and after the test was assumed to be an index for stain-proofness. The smaller the difference, the more excellent the stain removing property.

Storage stability : The obtained coating was put in a 50 ml glass screw bottle and stored for two weeks in a constant temperature vessel of 50° C. The viscosity of the coating before and after stored was measured with a Brookfield type viscometer. The results are classified as follows.

A: A change in viscosity of the coating is within a range of 80 to 150% of initial viscosity B: A change in viscosity of the coating is more than 150% and less than 200% of initial viscosity C: A change in viscosity of the coating exceeds 200% of initial viscosity D: The whole coating is agglomerated It can be considered that the coatings which can stand under usual service conditions are those of the above levels A and B.

taining a non-fluorine-containing monomer (a) having carboxyl group and/or acetoacetyl group and a reactive α,β-unsaturated group, in an aqueous medium in the presence of particles of a fluorine-containing polymer (A), (ii) a polyvalent metal compound, and (iii) a pigment, said carboxyl group and/or acetoacetyl group of said polymer (B) coordinate-bonding to said metal compound to form a crosslinked structure.

* * * * *

TABLE 2

|  | Example | | | | | | | | | | | Com. E | | | |
| --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 1 | 2 | 3 | 4 |
| Aqueous dispersion of fluorine-containing seed polymer (B) | | | | | | | | | | | | | | | |
| Preparation Example No. | 3 | 4 | 5 | 5 | 5 | 5 | 5 | 6 | 7 | 8 | 2 | 2 | 5 | 5 | 9 |
| Addition amount *1 (part by Weight) | 100 (50) | 100 (50) | 100 (50) | 100 (50) | 100 (50) | 100 (50) | 100 (50) | 100 (50) | 100 (50) | 100 (50) | 100 (50) | 100 (50) | 100 (50) | 100 (50) | 100 (50) |
| Polyvalent metal compound *2 (part by weight) | | | | | | | | | | | | | | | |
| Zinc acetate | 0.24 (1) | 0.5 (1) | 1 (1) | — | — | — | 0.2 (0.2) | 2.7 (2.7) | — | 3.73 (1) | 6.93 (1) | 0.06 (1) | — | 3.2 (3.2) | 8.84 (8.84) |
| Calcium chloride | — | — | — | 0.5 (1) | — | — | — | — | — | — | — | — | — | — | — |
| Magnesium nitrate | — | — | — | — | 0.54 (1) | — | — | — | — | — | — | — | — | — | — |
| Zirconium nitrate | — | — | — | — | — | 1.2 (1) | — | — | — | — | — | — | — | — | — |
| Copper acetate | — | — | — | — | — | — | — | — | — | 0.55 (1) | — | — | — | — | — |
| Storage stability | B | B | B | B | B | B | B | B | B | B | B | B | A | C | C |
| Physical properties of coating film | | | | | | | | | | | | | | | |
| Gloss | 73 | 72 | 67 | 65 | 69 | 61 | 72 | 53 | 64 | 63 | 52 | 72 | 73 | 48 | 43 |
| Pencil hardness | B | B | F | H | H | H | F | 2H | F | 2H | 2H | 2B | 2B | 2H | H |
| Alkali resistance (Δ b) | 1.8 | 2 | 2.1 | 2.3 | 2.6 | 2 | 1.8 | 3.2 | 3.1 | 3.1 | 4.5 | 1.7 | 2 | 4.3 | 6.2 |
| Hot water resistance | ○ | ○ | ○ | ○ | ○ | ○ | ○ | ○ | ○ | ○ | ○ | X | Δ | Δ | Δ |
| Stain-proofing property (Δ L) | 8.9 | 8.6 | 7.1 | 5.4 | 6.3 | 5.5 | 7.2 | 4.8 | 7.5 | 4.6 | 4.9 | 13.1 | 15.2 | 5.6 | 7.3 |
| Stain removable property (Δ L) | 9.5 | 7.9 | 7.6 | 5.3 | 6.1 | 8.9 | 9.8 | 5.1 | 7.3 | 4.3 | 4.1 | 12.3 | 14.1 | 5 | 6.6 |

*1 Values in the parentheses are solid contents (part by weight).
*2 Values in the parentheses are equivalents to a functional group.

According to the present invention, it is possible to provide an aqueous-dispersing composition of a crosslinkable fluorine-containing resin which can give a coating having excellent storage stability and forming a coating film having an excellent stain-proofing property and stain removing property, and having sufficient gloss and hardness.

What is claimed is:

1. An aqueous-dispersing composition of crosslinkable fluorine-containing resin which comprises (i) an aqueous dispersion of a fluorine-containing polymer (B) obtained by seed-polymerizing a non-fluorine-containing monomer containing a non-fluorine-containing monomer (a) having carboxyl group and/or acetoacetyl group and a reactive α,β-unsaturated group, in an aqueous medium in the presence of particles of a fluorine-containing polymer (A), and (ii) a polyvalent metal compound, said carboxyl group and/or acetoacetyl group of said polymer (B) coordinate-bonding to said metal compound to form a crosslinked structure.

2. An aqueous-dispersing composition of crosslinkable fluorine-containing resin which comprises (i) an aqueous dispersion of a fluorine-containing polymer (B) obtained by seed-polymerizing a non-fluorine-containing monomer con-